United States Patent [19]

Farkas

[11] 3,881,855

[45] May 6, 1975

[54] INJECTION BLOW MOLDING APPARATUS

[76] Inventor: Francis Farkas, c/o Clearplass Container Inc., Phelps, N.Y. 14532

[22] Filed: Jan. 16, 1973

[21] Appl. No.: 324,148

[52] U.S. Cl............425/342; 425/DIG. 211; 425/DIG. 209
[51] Int. Cl........B29d 23/02; B29d 23/03
[58] Field of Search........264/97; 425/242 B, 342, 425/DIG. 211, DIG. 213, DIG. 209

[56] References Cited
UNITED STATES PATENTS

| | | | |
|---|---|---|---|
| 3,305,890 | 2/1967 | Senior et al. | 264/97 X |
| 3,345,687 | 10/1967 | Marx | 264/97 X |
| 3,785,761 | 1/1974 | Logomasini et al. | 425/DIG. 211 |
| 3,804,573 | 4/1974 | DelPiero | 425/DIG. 211 |

*Primary Examiner*—Francis S. Husar
*Assistant Examiner*—David S. Safran
*Attorney, Agent, or Firm*—Charles R. Fay

[57] ABSTRACT

High production injection blow molding by constantly traveling a series of cored blow cavity molds in a closed path, and by injecting plastic to form parisons (blanks) on the cores in the blow cavity molds while the latter are open. The injection is done by means of cavities in an injection cavity mold having a short synchronized travel with each blow cavity mold in turn, the blow mold cavities thereafter closing, the molded articles being formed by air under pressure directed through the cores into the parisons; curing (cooling), ejecting, and completing the closed path for continuous production without the use of intermittent steps.

15 Claims, 16 Drawing Figures

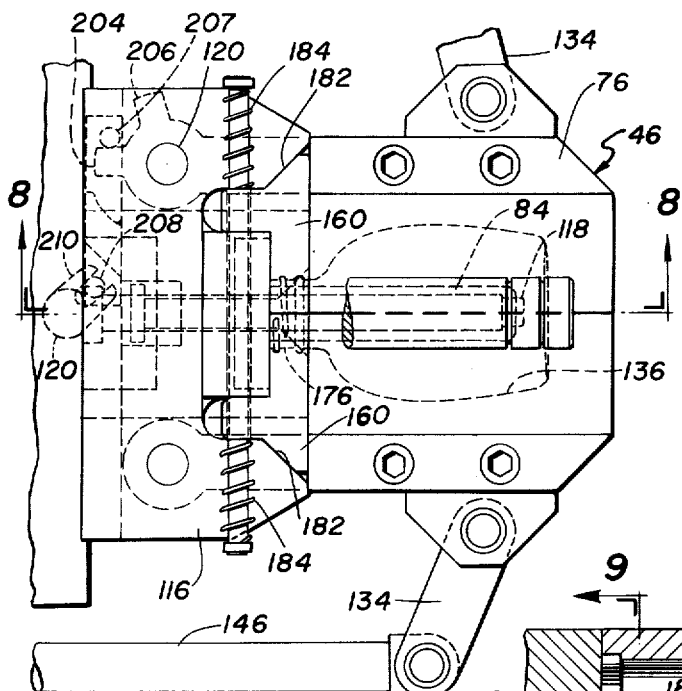
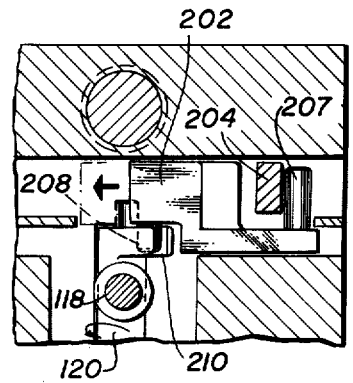
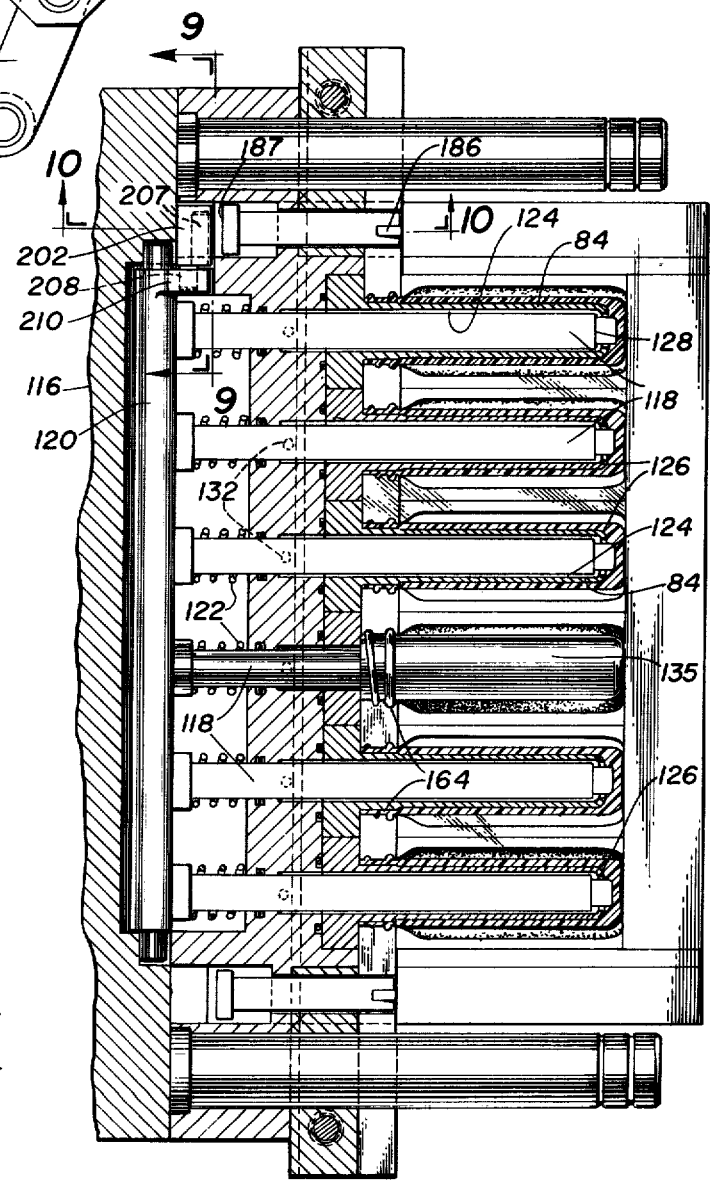
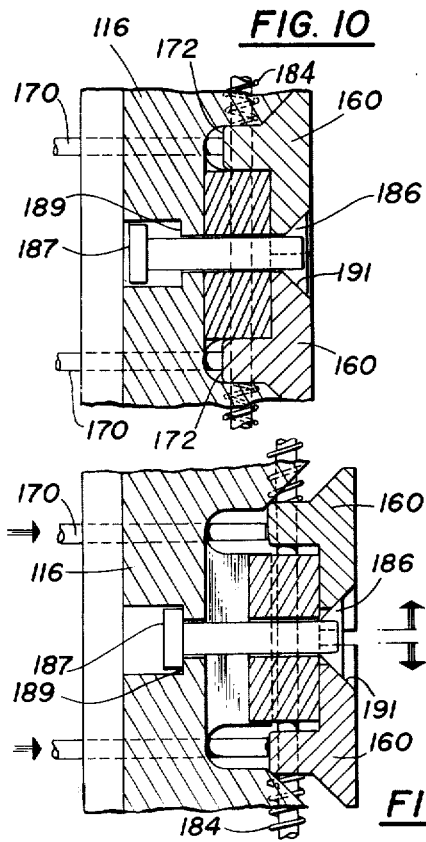
FIG. 7
FIG. 9
FIG. 10
FIG. 10a
FIG. 8

INJECTION BLOW MOLDING APPARATUS

BACKGROUND OF THE INVENTION

Greater production of plastic articles per machine is a consideration that is always in demand and any increased production, especially with relation to floor spaced required, is a step forward in the art. Restricted necked plastic containers are increasingly in demand, particularly as to small bottles for tablets and pills. These are most expeditiously and economically made by injection blow molding, but it is still desirable to increase machine capacity, i.e., to make greater quantities per injection unit. There have been many suggestions: duplicating the injection unit and hopper, etc.; injecting and blowing simultaneously with the use of a shuttle motion, etc.; but heretofore injection blow molding has required an intermittent motion, e.g., the shuttle, so that time is lost during the intermittent steps of the shuttle. A rotary turret with a plurality of blow mold cavities has been used with a single injection station, but this requires a step-by-step intermittent travel, and this is time consuming.

It is the purpose of this invention to provide a turret machine in which there is no waste of time (stopping) but on the other hand, the turret turns constantly and at a constant rate, the injection taking place while the turret (or other conveyor) is moving. This increases production using a single hopper and single (but moving) injection station.

SUMMARY OF THE INVENTION

A rotor (turret) rotates continuously at a constant speed. It has a series of chordal flats on each of which there is a cored blow cavity mold. There may be any number of such molds, one or a plurality, e.g., six, eight, or ten, and the same is true as to the number of cores per blow mold, with a blow cavity for each core.

A structure similar to a "walking beam" straddles the turret diametrically thereof and is pivoted on the turret axis. The walking beam oscillates on this axis. There is a reciprocatory platen at one end of the walking beam, and on the platen there is an injection cavity mold with a cavity for each core of any one of the blow cavity molds. The platen with its injection cavity mold oscillates with the beam and thereby moves on an arc for a short distance with each blow cavity mold, successively, with the blow cavities open. The injection cavity mold is moved rectilinearly into and out of operative relation to the cores of the blow cavity mold to coincide with such cores for a predetermined period of time during which a parison (blank) is formed on each core by the injection of plastic into the cavities in the injection cavity mold. At this point the cores of the blow cavity mold and the injection cavity mold may be said to be closed relative to each other.

The injection cavity mold then retracts from the blow cavity mold which retains the molded parisons on the cores thereof, and the walking beam returns to align the injection cavity mold with the next succeeding blow cavity mold and the injection is repeated. The cavities of the first-named blow mold, with the parisons, close upon retraction of the injection cavity mold, and air is introduced into the parisons through the cores, which have a special construction, at a pressure sufficient to expand the parisons into conformity with the walls of the cavities of the blow cavity mold. The thus completed articles (containers) then cure (cool) as the turret continues to rotate; and the blow cavity mold thereafter opens, ejects, and passes once again to the injection position.

A novel separable neck ring unit in each blow cavity mold forms screw threads, lugs, or other designs on the restricted neck portions of containers for the reception of closure caps. The neck ring has an additional function, that of initiating the ejection of the finished articles.

An extrusion device is used to supply the plastic to a ram which injects the plastic through a flexible swivel pipe in timed relation to the action of the molds.

The injection period is timed and takes place while the molds are locked and move together in synchronism, the blow cavities being held open. Each blow cavity comprises a pair of hinged mold cavity halves for each core, these cores being in a central position with respect to the blow mold halves. The actual timing is dependent on the conditions of molding and can be determined without undue experimentation by those skilled in the art. The cores are free-ended cylinders with interior pins which are relatively rectilinearly moved and form on and off valves operative at timed intervals to allow the air to pass through the cylinders at the correct instant entering the parisons at the free ends of the pins, i.e., at the bottoms of the parisons where the containers bottoms are formed, the separable neck ring unit being located at the bases of the cores in each blow cavity mold.

BRIEF DESCRIPTION OF THE DRAWINGS

FIG. 7 is a view in elevation of the blow cavity mold with the cavities closed, and indicating the article formed;

FIG. 8 is a longitudinal sectional view taken on line 8—8 of FIG. 7, showing the blow cavity mold with its cavities closed just prior to the blowing action, the parisons being disclosed on the cores;

FIG. 9 is a section on lines 9—9 of FIG. 8;

FIG. 10 is a section on lines 10—10 of FIG. 8 with parts omitted for clarity;

FIG. 10a is a section similar to FIG. 10, showing the action of the neck ring;

GENERAL DESCRIPTION OF THE MACHINE

Figure 1:
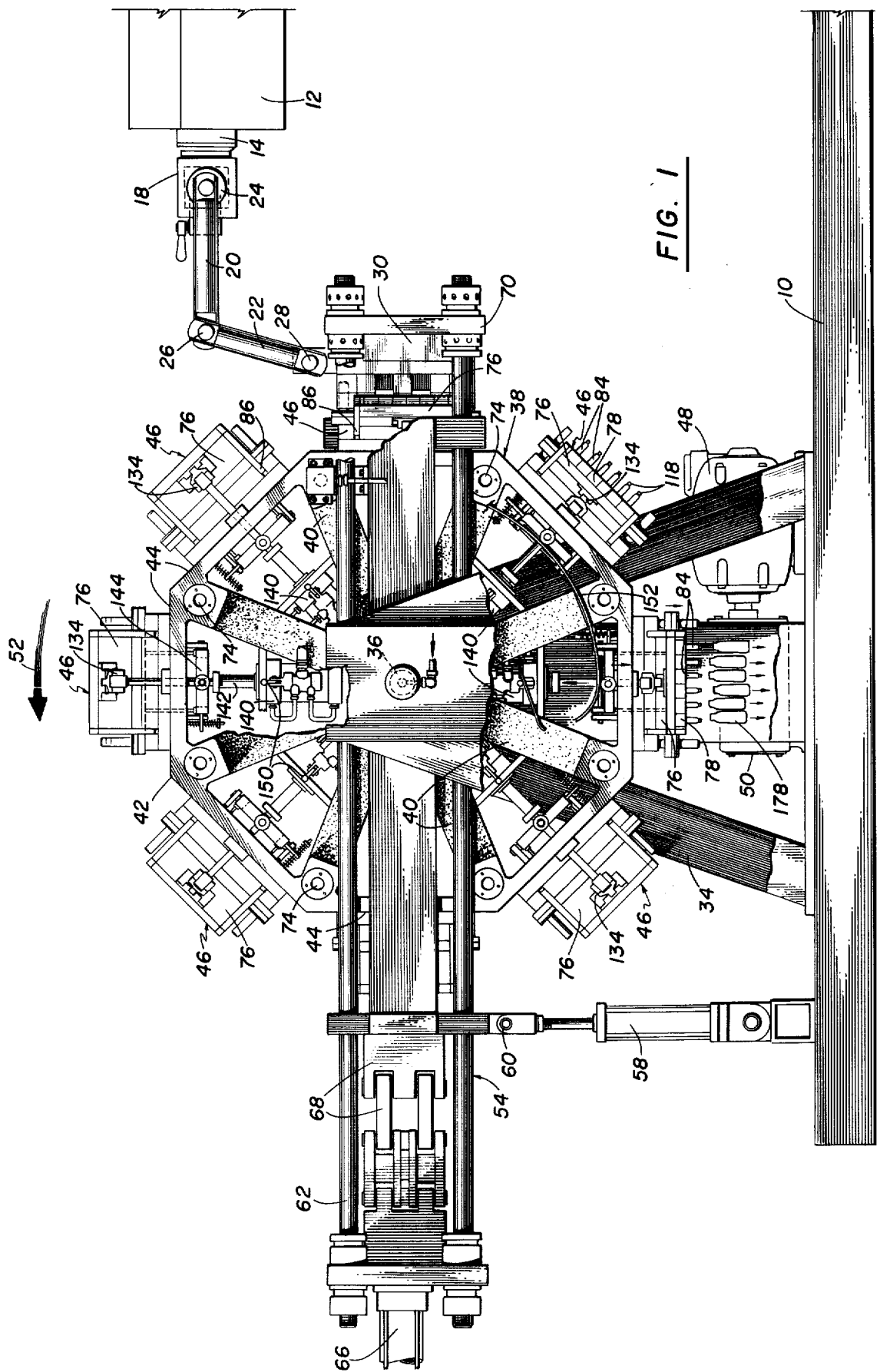
FIG. 1 is a view in side elevation illustrating the machine.

Referring more particularly to FIGS. 1 to 4 inclusive, a base 10 may be utilized to support the entire machine. Adjacent one end of the base, or separately if desired, there is mounted a commercial extruder 12 shown only in outline inasmuch as this forms no part of the invention per se. However, at its extrusion end the barrel thereof indicated at 14 feeds the plastic to a ram 16 in an appropriate casing 18 in a continuous manner, the ram however intermittently injecting the plastic material through a flexible system comprising links 20 and 22 appropriately swiveled with respect to the ram at 24, link 20 being swiveled to link 22 at 26 and link 22 at 28 with respect to the injection cavity mold which is generally indicated at 30. The links 20 and 22 are provided with hollow passages, i.e., tubes, for the passage of the shots of the injection plastic as indicated in dotted lines at 32 in FIG. 2.

A stand 34 mounts a shaft or axle 36 rotatably mounting a turret generally indicated at 38. This turret is provided with a construction such as legs or struts 40, 40 which in turn mount a periphery member 42 having a series of chordal flats 44 to each of which is appropriately connected a blow cavity mold generally indicated at 46.

Means is provided to rotate the turret continuously at a constant desired predetermined speed and this may take the form of a conventional motor and reduction gearing as at 48, 50. The turret turns in the direction of arrow 52.

Straddling the turret there is a "walking beam" or similar structure which is generally indicated by the reference character 54. This walking beam comprises a framework extending to both sides of the turret and it is pivoted coaxially with respect thereto at the shaft or axle 36 of the turret.

Figure 2:
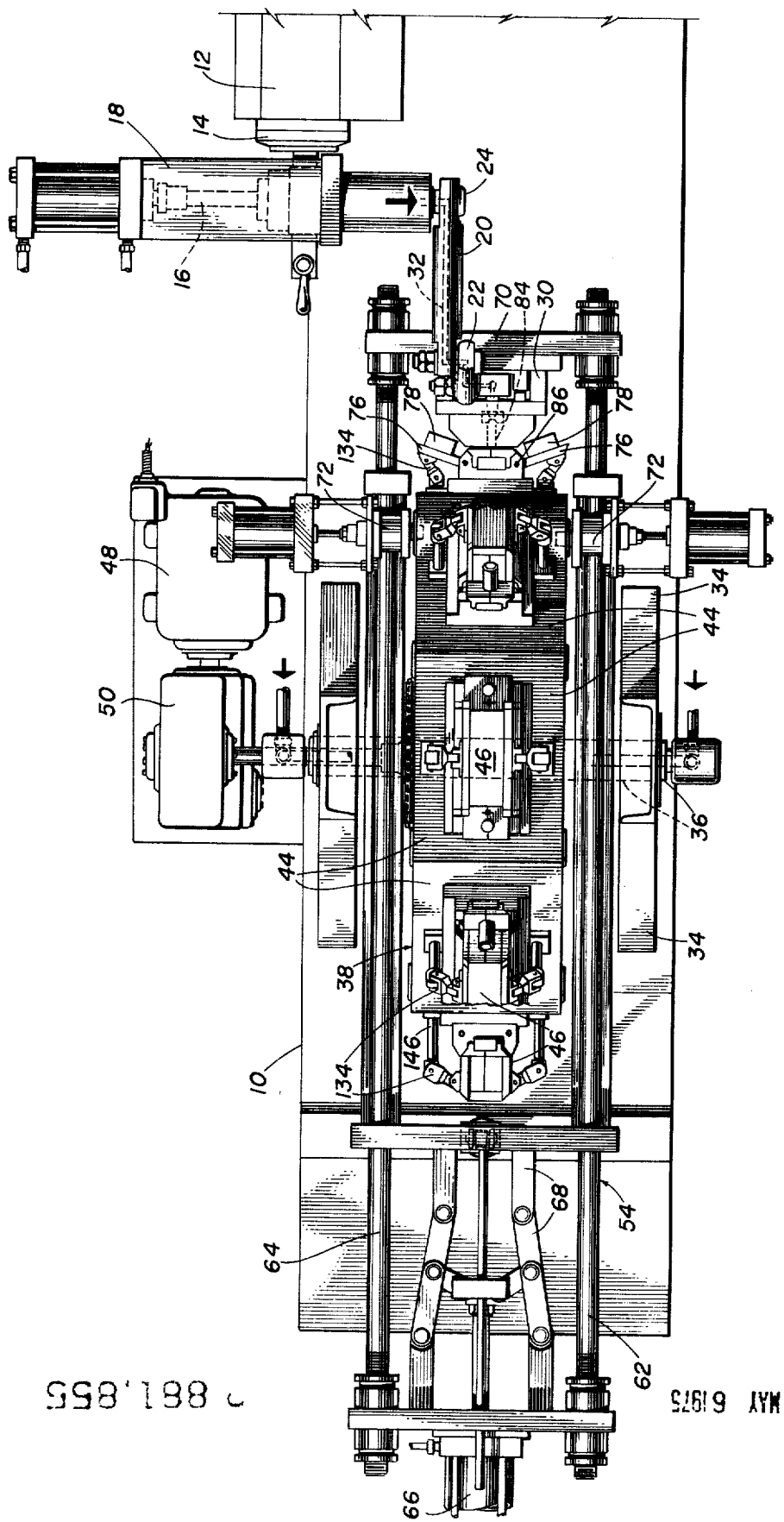
FIG. 2 is a top plan view of FIG. 1.
Figure 3:
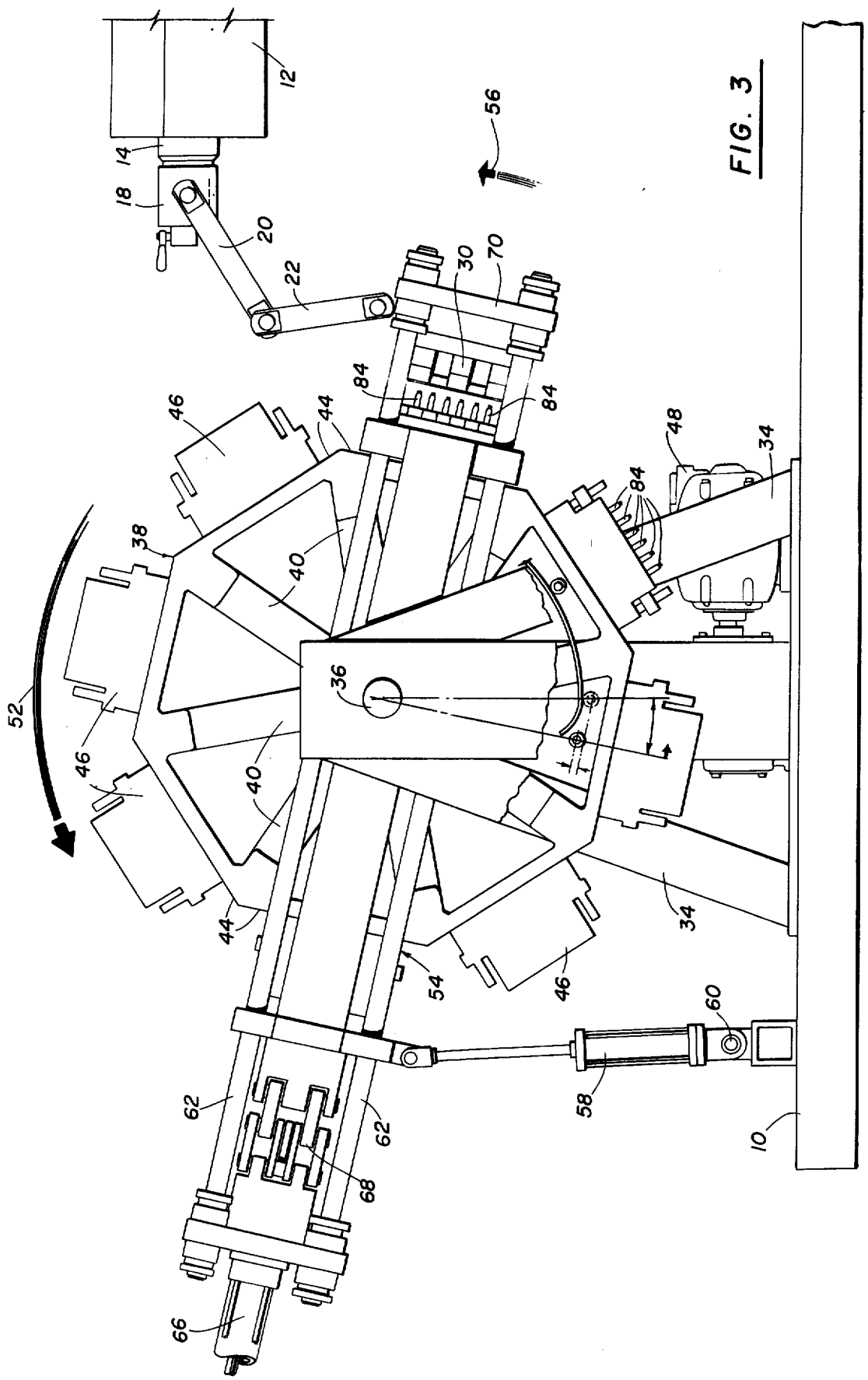
FIG. 3 is a view in side elevation similar to FIG. 1 but showing the walking beam and the injection cavity mold at the initiation of the injection step in the cycle.
Figure 4:
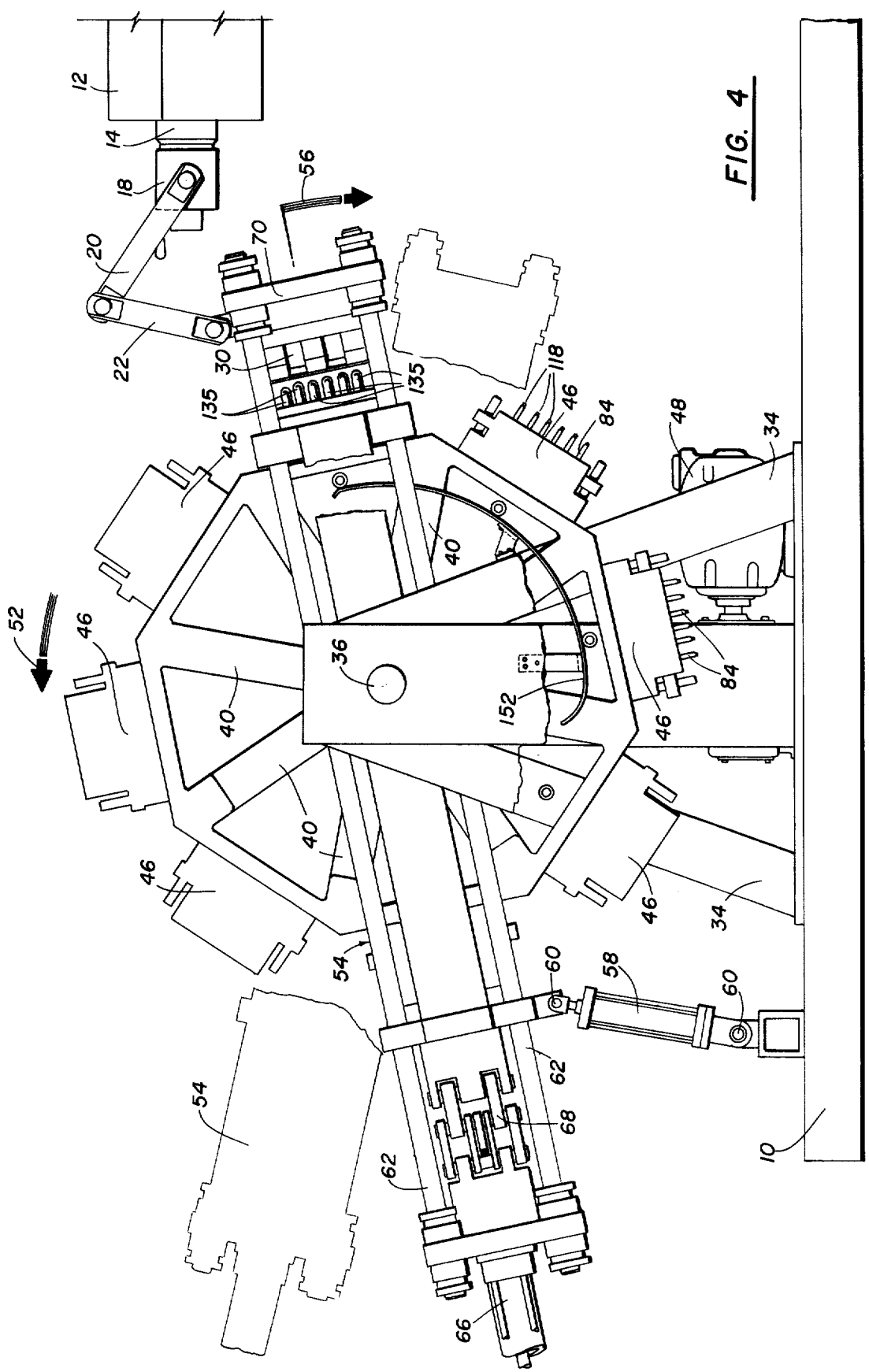
FIG. 4 is a similar view showing the end of the injection step, the injection cavity mold being retracted from the blow cavity mold.

The beam is oscillated in the directions shown by arrows 56, FIGS. 3 and 4, by means of a pivoted ram or pneumatic cylinder 58 or the like pivotally connected with the base 10 and beam 54 as at 60, 60. The walking beam also includes two pairs of reciprocal rods as at 62, 64, these rods being reciprocated by another ram 66 through a linkage generally indicated at 68. This linkage is best seen in FIG. 2 and its purpose is to reciprocate the injection cavity mold 30 which is mounted on a platen 70 mounted at the righthand end of the rods 62, 64, FIGS. 1 and 2.

Reference character 72 represents pneumatic means at each side of the beam 54 for locking the beam with respect to the turret by means of recesses 74 in the turret for certain relatively short predetermined periods to properly align injection cavity mold 30 and each blow cavity mold 46 in turn, during a part of the cycle of operation of the turret with respect to the plastic injection means including the ram 16, flexible conduit system 20 and 22, injection cavity mold 30, etc.

GENERAL OPERATION

The walking beam moves in a clockwise direction from the FIG. 1 position which is central and intermediate the injection, to one extreme position thereof, FIG. 3, whereby injection cavity mold 30 thereon is moved downwardly (by ram 58) and then inwardly (by ram 66) to become aligned with and locked to one of the blow cavity molds 46. The locking means 72 takes effect so that the parts are properly aligned and will remain so for the duration of the injection step, and the ram 16 then starts to inject plastic through a manifold onto cores mounted on the blow cavity mold as will be more fully described hereinafter.

It being remembered that the turret is moving in the direction of arrow 52 at a constant speed, the direction of motion of the walking beam is reversed and it moves synchronously with the turret, to the full extent possible, see FIG. 4, during the injection, the injection cavity mold and the blow cavity mold also moving together, synchronously. At the end of the injection, automatic means releases the walking beam from the turret, at which point the injection has taken place fully. The walking beam once more reverses and moves again to the position of FIG. 3, etc.

Referring now to FIGS. 1 to 4, there are here shown pivoted arms 76, 76, upon which are mounted the blow cavity shells 78 on blow cavity mold 46 and it will be noted, FIGS. 2 and 3, that these are open, i.e., spread apart, revealing the cores 84 for the reception of the plastic, injected thereon by the injection cavity mold. Each arm 76 mounts a series of one-half cavity members 78, the arms being pivoted as at 86, 86.

There are a plurality of cores 84 on each blow cavity mold and once the blanks or parisons have been formed thereon, the injection cavity mold 30 starts to retract from the blow cavity mold. The arms 76, 76 close, the cavities completely enclose the cores, an air supply means mounted on the turret automatically comes into play and blows air through the cores to the free ends thereof, thereby acting upon the parisons, to form articles, e.g., bottles or containers against the walls of the blow cavity mold cavities.

The turrent continues to move in its anticlockwise direction, the blow cavities now being closed, the air cut off, and the articles molded being cured during a semi-revolution of the turret. The blow cavity molds once more open, and the articles are ejected, at the lowest point of the turret, which then proceeds with the blow cavity molds open as above described to the original injection station for the next injection, FIG. 3. It is to be remembered that each flat 38 mounts a blow cavity mold and a plurality of articles are formed in each such mold.

INJECTION CAVITY MOLD

Figure 5:
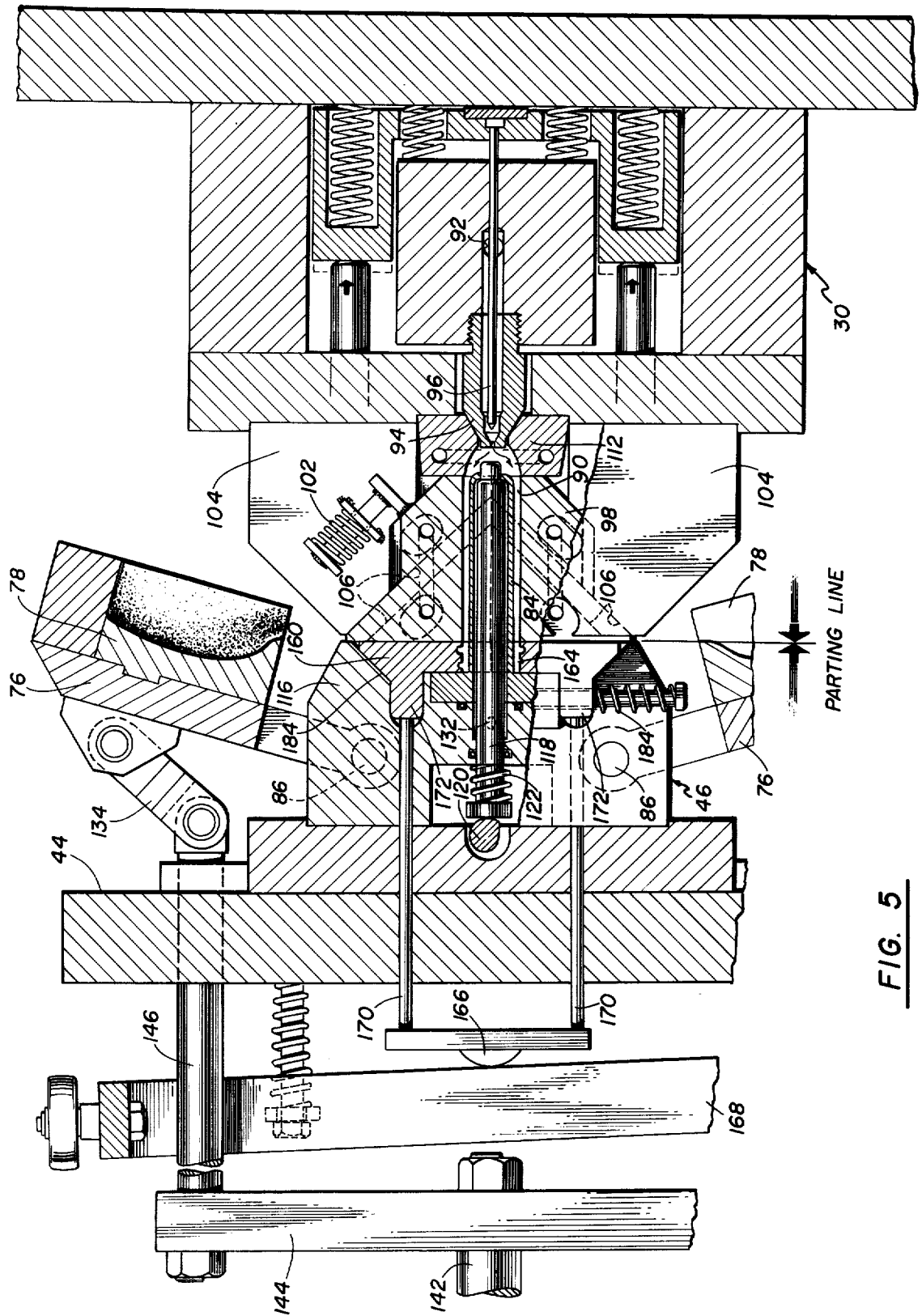
FIG. 5 is a generally horizontal section of the blow cavity mold closed with respect to the injection cavity mold, and shows the parts in position ready to inject plastic into the injection cavity mold cavities.
Figure 6:
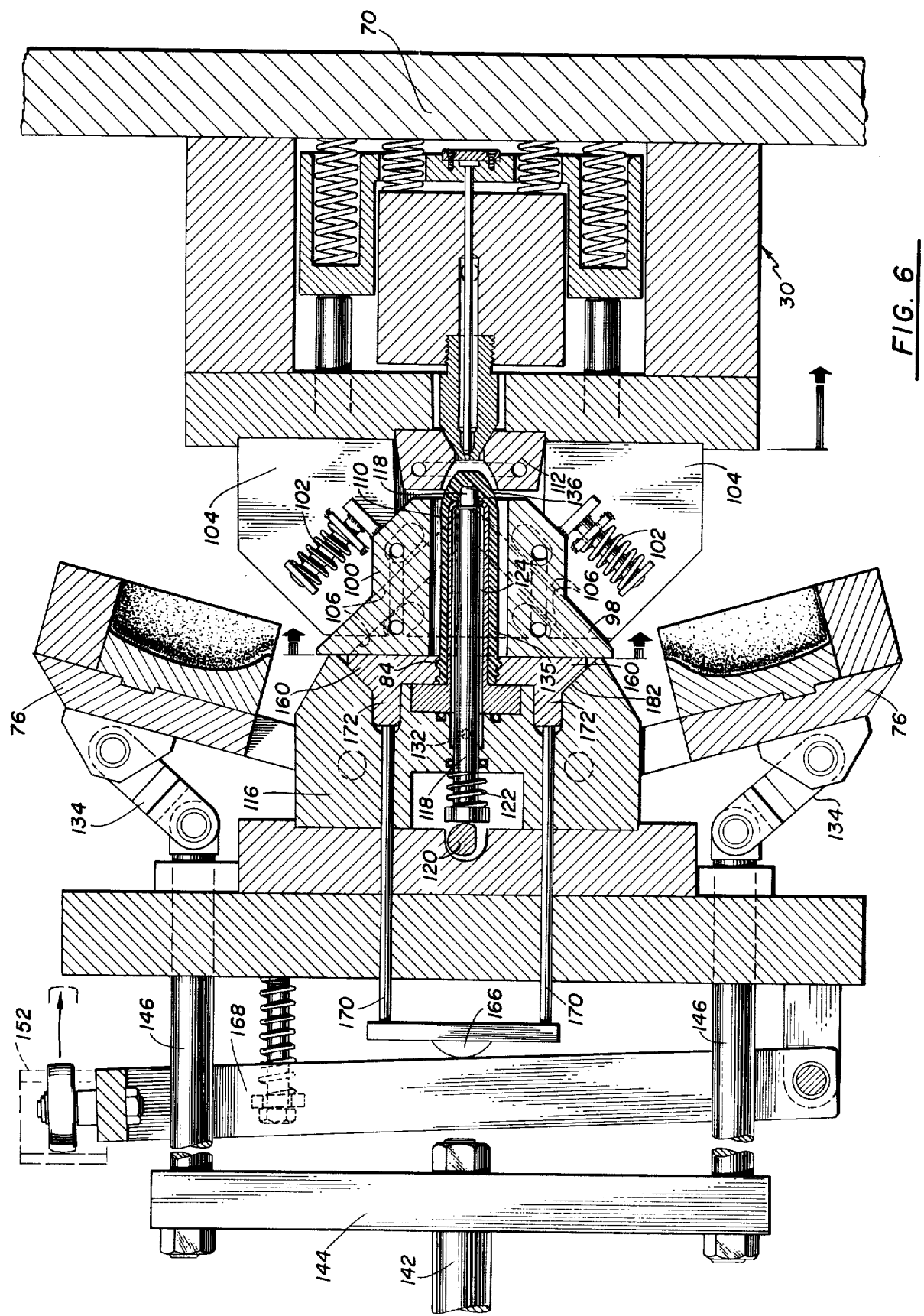
FIG. 6 is a similar view showing the injection cavity mold after the injection and in the initial stage of retraction, the parison being completed.

The injection cavity mold 30 includes a plurality of cavities 90, one for each core 84 on each blow cavity mold, as shown in FIGS. 5 and 6. These cavities are serviced by a manifold 92 receiving plastic by means of the ram 16 and conducted to nozzles 94 each having a timed cut-off device 96 of conventional construction. The cavities are located one-half in each of blocks 98, 100. That is these blocks form split cavities and the blocks 98, 100 are spring-biased by springs 102, 102 at each end of the injection mold, to cause the blocks to tend to come together to form cavity walls. The blocks 98, 100 and springs 102 are mounted on supports 104 forming a part of injection cavity mold 30. The split action will be seen from a comparison of FIGS. 5 and 6, the parting line being indicated in FIG. 5.

The cavity blocks 98, 100, which go to make up the cavities in the injection cavity mold have inclined slots 106, 106, therein in the form of a V, acting in the manner of cams to move these blocks to and from each other under the conditions of retraction and advance of the injection cavity mold. Cam followers, not shown, are located on support blocks 104, 104, and ride in slots 106. This construction will be understood by those skilled in the art, and the effect on the opening and closing action of blocks 98, 100, and hence on the cavities in these blocks will be clear. In FIG. 5 the molds are closed to form the cavities 90 for the injection and in FIG. 6 the injection cavity mold 30 has started its retraction after the injection. The springs 102 maintain the cavity blocks 98 and 100 flatly against a neck ring 160, to be later described, but which is a part of the blow cavity mold 46, but now blocks 98, 100 have been cammed apart, thus breaking away from the injected plastic 110, FIG. 6, preparatory to the complete withdrawal of the injection cavity mold 30, completely freeing the blanks or parisons. A separate tip or dome cavity part 112 forms the bottom of the plastic blanks or parisons 110. Further motion of mold 30 to the right in FIG. 6 separates the parts 98, 100 from the blow cavity mold 46 and still further motion of the mold 30 results in the cavities 90 being closed again under spring pressure. The blanks or parisons remain on cores 84.

THE BLOW CAVITY MOLD

Each blow cavity mold core actually comprises a fixed outer cylinder, indicated at 84, and a reciprocable core pin therein as at 118. Each blow cavity mold 46 includes a base 116 having cores for the slidable reception of the core pins 118. A cam 120 is provided to move the pins of each blow cavity mold to the extended injection position thereof, FIG. 5, and the cams operate at precise intervals as will be made more apparent hereinafter. Springs 122 urge the pins 118 in the opposite direction.

Figure 12:
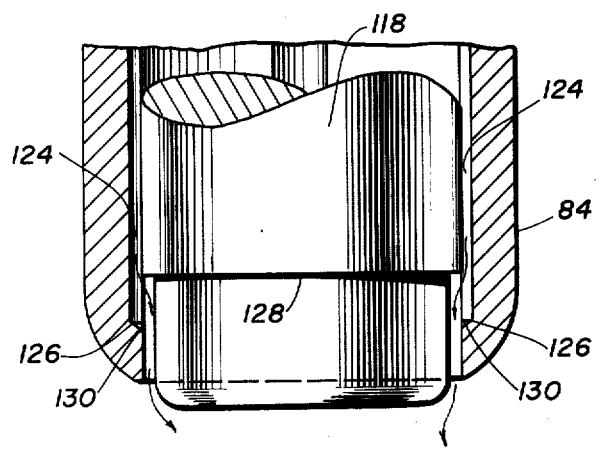
FIG. 12 is a view partly in section showing the air valve effect of the cores and the core pins on an enlarged scale.
Figure 13:
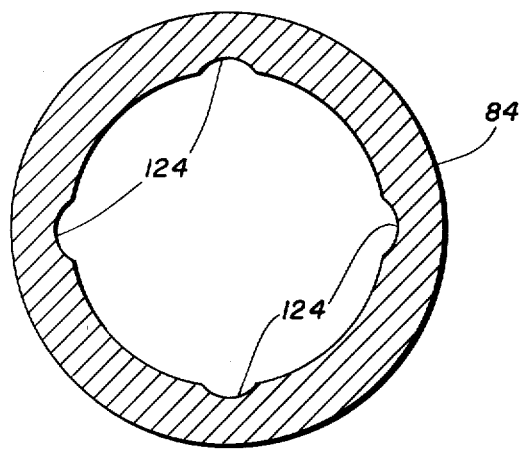
FIG. 13 is a transverse sectional view of a core.

As best shown in FIG. 12, the cores 84 are provided with longitudinal internal grooves forming air passages 124 which terminate adjacent the tips or free ends thereof as at 126. The pins 118 each have an outwardly extending shoulder at 128, adjacent the ends thereof; and the core cylinders are turned inwards at their ends forming shoulders 130. With the pins 118 in the position of FIG. 5, the passages 124 are closed off, and the injection can take place without fouling these passages. The plastic flow is indicated by arrows (FIG. 5) in the dome of cavity part 112 and the plastic surrounds the cores, as in FIG. 6.

When the injection is finished, the cut-off 96 is actuated and the injection cavity mold starts to retract as described above and cavity parts 78 come together and enclose the cores.

The cam 120 then turns to allow springs 122 to retract the core pins 118 which assume the position shown in FIG. 8 and air under pressure flows from constantly supplied inlets 132, along grooves 124, past shoulder 128 into the blanks (parisons) 135 at then closed ends 136, providing the blowing action that forms the articles by molding the parisons against the walls of the cavities in molds 78.

When the pins 118 are advanced, FIG. 5, during the injection portion of the cycle, the shoulders 128 conjoin with the shoulders 130 of the cores, and thus shut off the air flow.

Thus, the injection cavity mold having retracted, the cavity parts 78 swing closed under influence of air operated toggles 134, coming together to form a cavity about each core and plastic blank for the blowing action, the pins having been retracted to allow air to flow out the ends of the cores and pins with sufficient force to cause the blanks (parisons) to conform to the walls of the cavities, e.g., as indicated in broken lines at 136, FIG. 7. The turret continues its motion with the blow cavities closed until the molded articles are cured and then the cavities open to discharge the articles.

The toggles are operated by air cylinders 140 each having a rod 142 connected to a bar 144. The bar 144 is connected to slide rods 146, FIGS. 5 and 6, one for each toggle. Each air cylinder has a valve actuator 150 that is engaged and moved appropriately to the opening and closing action of the blow cavities by e.g., cams 152 in fixed positions on the stand 34.

Figure 11:
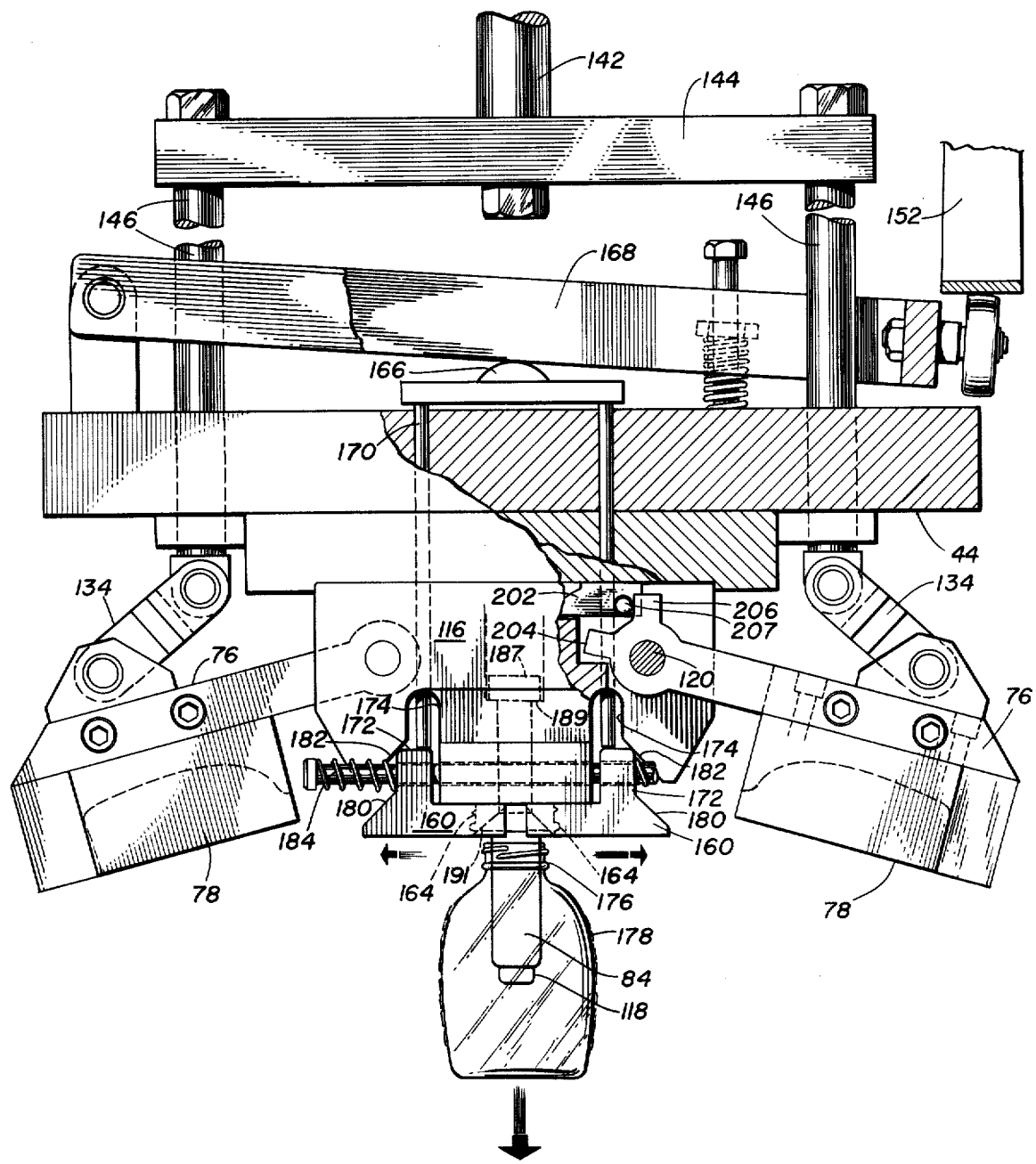
FIG. 11 is a view partly in section showing the blow cavity mold open and starting to eject.

A two part split neck ring 160 is located in the base 116 in position at the bases of the core cylinders 84 to produce screw threads, lugs, etc. in restricted neck portions of the injection cavities 90 as at 164, see FIG. 5, the plastic material penetrating into the neck ring for this purpose. Upon completion of the plastic injection, projection 166 is engaged by a spring-biased cam-moved rod or bar 168 and this moves pins 170 (to the right in FIGS. 5 and 6). These pins engage legs 172, one leg for each part of the neck ring, and the cavity parts 78 having now opened, the neck ring parts are urged to the right, FIG. 11. The legs 172 are slidingly guided rectilinearly by troughs 174 in the base 116. The neck rings are still interengaged with the formed threads or lugs on the restricted necks 176 of the molded articles so that the articles are longitudinally stripped from the core cylinders 84. The interiors of the necks of the articles are molded by the cores and take the same diameter but of course the articles 178 have been expanded by the blow molding action.

Each neck ring part has a chamfer 180 and in molding position of the molds, these contact chamfers 182 on base 116. Chamfers 182 are located to become operative after the initial rectilinear stripping action of the neck rings to guide the parts of the latter apart to free the molded articles. A pin 186 has a V-block at one end and a stop 187 at the other end and this pin moves with the neck ring in its rectilinear motion because the V-block engages chamfers 191 on neck ring parts 160, but at the instant the legs 172 clear the troughs 174, FIG. 10a, the stop 187 strikes shoulder 189 and the pin has to cease its motion. This forces the neck ring parts 160, 160 to separate, the V-block acting as a cam upon chamfers 191. The parts 160 are guided by chamfers 182 so that they continue outwardly and forwardly in guided condition. At this point, the articles are at the bottom of the turret and fall off into a box or conveyor. The neck ring parts return under influence of springs 184 to original molding position, the air having already been cut off by the valve effect of core pins 118 closing passages 124, and the turret has now turned to once more receive the injection cavity mold to repeat the cycle.

Figure 14:
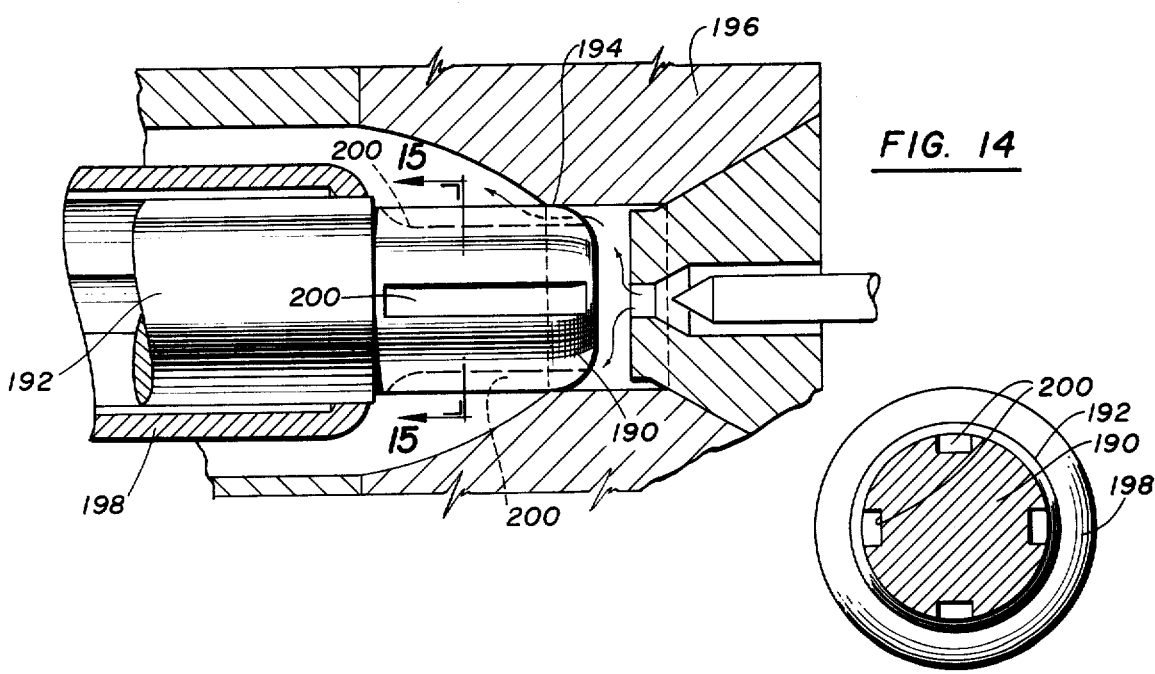
FIG. 14 is a longitudinal sectional view of a modified core and core pin with the injection cavity mold.
Figure 15:
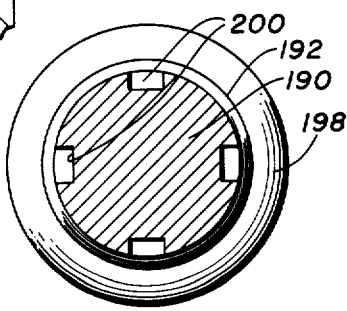
FIG. 15 is a section on line 15—15 of FIG. 14.

FIGS. 14 and 15 illustrate a modified core and core pin for long articles. In this case the free end 190 of the core pin 192 extends far enough to engage the neck 194 of the dome part 196 in the injection cavity mold, in the air closed position for injecting, and this locks the core 198 in place. This insures the core against any possible wobble which may result in uneven parisons and consequent uneven wall thicknesses in the finished product. The plastic finds a passage into the cavity mold by means of longitudinal grooves 200 in the extended end 190 of the core pin 192.

The various cams are formed and arranged and the timing actions provided for different conditions, articles to be made, etc., according to knowledge of those skilled in the art and these will vary according to speeds and feeds, number of blow cavity molds, number of cores, etc. For instance, the cam 120 may be actuated e.g., by a "lost motion" device 202, FIGS. 7, 8, 9, which may have a pair of spaced lugs 204 and 206 to be partially rotated by the action of the toggle and cavity arm 76 to which it is attached. This action moves a pin 207 on the member 202 which also has a pin 208 in a clevis 210 on the cam 120 to rock the latter at the correct instant. All the various motions are achieved basically through the motion of the turret relative to the stand and the walking beam.

I claim:

1. An injection molding machine comprising a series of molds, a core for each mold, means constantly traveling said molds in a closed path, a plastic injection device, means to travel the latter in synchronism with each mold successively for a portion only of said path, means to actuate the plastic injection device to cause the same to inject plastic material onto the core of each mold during the period of mutual travel of each mold and the plastic injection device,
   a cavity in the plastic injection device, said cavity receiving each core in turn, said cavity forming the plastic on each core in turn, the plastic injection device injection plastic into said cavity,
   a pair of cavity forming members on each mold, means to open and close said members about the core on the respective mold, and
   means to blow air into the plastic on each core upon closing of the cavity forming members on each mold.

2. The injection molding machine of claim 1 including an air passage in the core for the blown air.

3. The injection molding machine of claim 2 wherein each core comprises a core cylinder and a core pin therein, the cylinder and core pin including means together forming an air valve, and means to rectilinearly move the core pin relative to the core cylinder to open and close the valve in timed relation to the closing of the cavity forming members on the mold.

4. An injection blow molding machine comprising a series of blow molds, a core for each mold, means to travel said molds in a closed path, an injection cavity mold, a cavity in the latter, means to bring the injection cavity mold into closed cooperation relative to each of the blow molds successively with a core located in the cavity, means to travel the injection cavity mold with each of the blow molds in closed relationship therewith for a portion only of the path of the blow molds, means to separate the molds, means on the injection cavity mold to inject molding material into the cavity forming a blank on the respective core during the interval of the mutual travel of the molds, means blowing air into the blank to form an article, and means to operate said last named means upon separation of the molds.

5. The injection blow molding machine of claim 4 including movable members forming a cavity in each blow mold about the respective core, and timed means holding the movable members separated during the injection and closing the blow mold cavity members about the core after the injection but before the blowing of the air.

6. The injection blow molding machine of claim 5 including a neck ring forming a part of each cavity in the blow mold, and means to move the neck ring parallel to the cores to strip the articles from the cores, upon opening of the cavities in the blow cavity mold.

7. The injection blow molding machine of claim 6 wherein the neck ring comprises two separable parts, and including means to separate the neck ring parts to release the articles stripped from the cores.

8. An injection blow molding machine comprising:
   a turret, means to turn the turret unidirectionally and constantly on an axis, a series of blow cavity molds in mutually spaced relationship about the periphery of the turret, movable pairs of cavity-forming members on each blow cavity mold, timed means to open and close the cavity-forming members, a core associated with each pair of cavity-forming members to be exposed when the latter are open and enclosed when said members are closed,
   an injection cavity mold, injection cavities in the latter surrounding the cores, means to travel the injection cavity mold in synchronization with each blow cavity mold successively for a portion only of the travel of the blow cavity molds, timed means to close the molds relative to each other with a core in each injection cavity mold cavity, means to inject plastic into each of the last named cavities about the core therein during the mutual travel of both molds,
   means to retract the molds, a source of air under pressure, an air passage therefor leading into the cores to form articles of said plastic by expanding the plastic into conformance with the blow cavity mold cavities with the latter closed, and means to reopen the blow cavity mold cavities for ejection of the articles so formed.

9. The injection blow molding machine of claim 8 wherein the means to travel the injection cavity mold includes an oscillatory member and means to oscillate the same.

10. The injection blow molding machine of claim 9 wherein the oscillatory member is pivoted on an axis generally coincident with the axis of the turret.

11. The injection blow molding machine of claim 10 wherein the oscillatory member is diametrically arranged relative to the turret.

12. The injection blow molding machine of claim 11 including a platen on the oscillatory member, the injection cavity mold being mounted on the platen.

13. The injection blow molding machine of claim 8 including a source of plastic material and a flexible conduit for the plastic leading from the source of plastic to the injection cavity mold.

14. The injection blow molding machine of claim 8 wherein the turret is vertical and its axis is horizontal, the means to travel the injection cavity mold comprising a beam pivoted coaxially with respect to the turret, and means to oscillate the beam on its axis.

15. The injection blow molding machine of claim 14 wherein the injection cavity mold is slidable on the beam to close with and retract from the blow cavity mold, the means to close the molds including means on the beam to reciprocate the injection cavity mold.

* * * * *